United States Patent
LaCivita et al.

(10) Patent No.: US 9,898,353 B2
(45) Date of Patent: Feb. 20, 2018

(54) TYPE AGNOSTIC DATA ENGINE

(71) Applicant: thePlatform, LLC, Seattle, WA (US)

(72) Inventors: Jeremy John LaCivita, Seattle, WA (US); Daniel Niland, Seattle, WA (US)

(73) Assignee: COMCAST CABLE COMMUNICATIONS MANAGEMENT, LLC, Philadelphia, PA (US)

( * ) Notice: Subject to any disclaimer, the term of this patent is extended or adjusted under 35 U.S.C. 154(b) by 0 days.

(21) Appl. No.: 15/007,984

(22) Filed: Jan. 27, 2016

(65) Prior Publication Data

US 2016/0217018 A1 Jul. 28, 2016

Related U.S. Application Data

(63) Continuation of application No. 14/151,451, filed on Jan. 9, 2014, now Pat. No. 9,280,401.

(51) Int. Cl.
*G06F 9/54* (2006.01)
*G06F 9/50* (2006.01)

(52) U.S. Cl.
CPC ............ *G06F 9/541* (2013.01); *G06F 9/5055* (2013.01)

(58) Field of Classification Search
CPC ......... G06F 9/4862; G06F 9/541; G06F 9/546
USPC .................................. 719/317, 328
See application file for complete search history.

(56) References Cited

U.S. PATENT DOCUMENTS

2008/0243903 A1* 10/2008 Vidos ................ G06F 17/30038
707/E17.009

* cited by examiner

*Primary Examiner* — Andy Ho
(74) *Attorney, Agent, or Firm* — Ballard Spahr LLP (57) ABSTRACT

Systems and methods for processing and/or presenting data are disclosed. In an aspect, one method can comprise receiving a request for information and detecting a type of data representing the information requested. The data can be processed via a type-dependent agent and the processed data can be provided via an agnostic data engine.

20 Claims, 7 Drawing Sheets

TYPE AGNOSTIC DATA ENGINE

CROSS REFERENCE TO RELATED APPLICATION

This application is a Continuation of U.S. Non-Provisional patent application Ser. No. 14/151,451 filed Jan. 9, 2014, now issued as U.S. Pat. No. 9,280,401, herein incorporated by reference in its entirety.

BACKGROUND

Users can receive data such as content using various software programs. Often a software program will have a dedicated application programming interface (API). Accordingly, editors and creators of content often provide multiple versions of the same content in order to be consumed using the various API's. Such a practice is inefficient and resource heavy. These and other shortcomings are identified and addressed by the disclosure.

SUMMARY

It is to be understood that both the following general description and the following detailed description are exemplary and explanatory only and are not restrictive. The methods and systems of the present disclosure, in one aspect, provide a data engine as a data type agnostic (e.g., not dependent on data type) interface. In an aspect, the data engine can be configured as a common API across various data types and/or platforms.

In an aspect, methods can comprise receiving a request for information and detecting a type of data representing the information requested. The data can be processed via a type-dependent agent and the processed data can be presented via an agnostic data engine.

In another aspect, methods can comprise detecting a configuration of a device and selecting a type-dependent agent based upon the detected configuration. Data can be processed via the selected type-dependent agent and the processed data can be presented or further processed via an agnostic data engine.

In yet another aspect, methods can comprise receiving first data having a first type and receiving second data having a second type. The first data can be processed via a first type-dependent agent and the second data can be processed via a second type-dependent agent. One or more of the processed first data and the processed second data can be presented or further processed via an agnostic data engine.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium.

More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The methods and systems of the present disclosure, in one aspect, provides a data engine such as a video playback mechanism having a single API that can operate works across various platform and/or format implementations. The data engine can minimize the number of duplicative data assets an editor or creator has to create, since a single version can be processed by the data engine across multiple platforms. In another aspect, the data engine can be configured as a type agnostic (e.g., not dependent on data type) interface. In an aspect, the data engine can be configured as a common API across various data types and/or platforms, while maintaining user-facing functionality. In another aspect, the data engine can be implemented as a low level API for data consumption (e.g., content playback) to provide one or more interactive functions (e.g., start, pause, seek, etc.) with received data.

Figure 1:
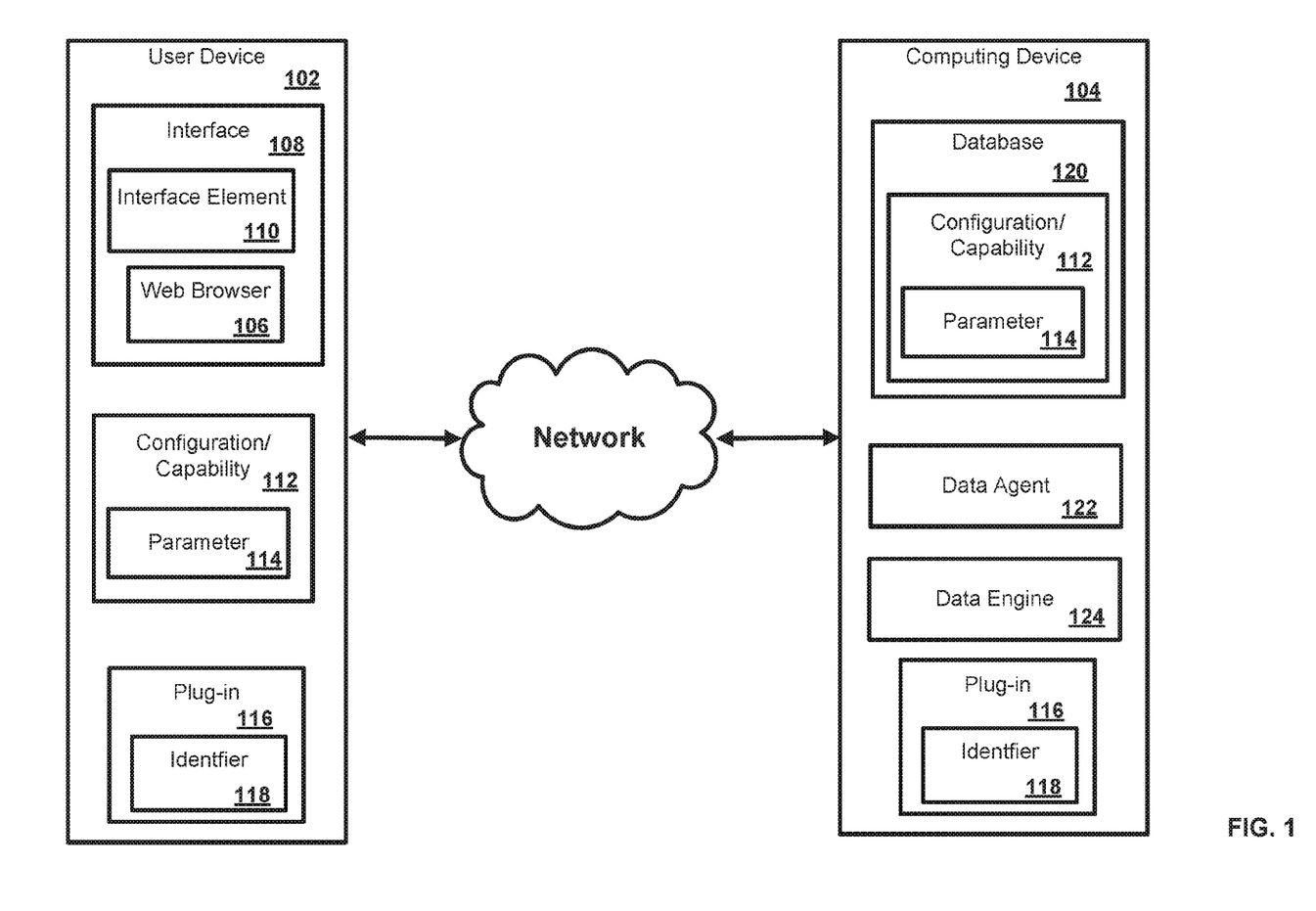
FIG. 1 is a block diagram of an exemplary network.

FIG. 1 illustrates various aspects of an exemplary network in which the present methods and systems can operate. The present disclosure relates to an agnostic data engine. Those skilled in the art will appreciate that present methods may be used in systems that employ both digital and analog equipment. One skilled in the art will appreciate that provided herein is a functional description and that the respective functions can be performed by software, hardware, or a combination of software and hardware.

A system 100 and network can comprise a user device 102 in communication with a computing device 104, such as a server, for example. The computing device 104 can be disposed locally or remotely relative to the user device 102. As an example, the user device 102 and the computing device 104 can be in communication via a private or public network, such as the Internet. Other forms of communications can be used, such as wired and wireless telecommunication channels.

In an aspect, the user device 102 can be an electronic device such as a computer, a smartphone, a laptop, a tablet, a set top box, or other device capable of communicating with the computing device 104. As an example, the user device 102 can comprise a web browser 106 for providing an interface to a user to interact with the user device 102 and/or the computing device 104. The web browser 106 can be any interface for presenting information to the user and receiving a user feedback, such as Internet Explorer, Mozilla Firefox, Google Chrome, Safari, or the like. Other software, hardware, and/or interfaces can be used to provide communication between the user and one or more of the user device 102 and the computing device 104. As an example, the web browser 106 can request or query various files from a local source and/or a remote source.

In an aspect, the user device 102 can comprise an interface 108, such as a user interface or API. As an example, the interface 108 can be configured to provide a visual presentation, audio presentation, interactive communication, and the like. As a further example, interface 108 can comprise one or more interface elements 110. In an aspect, the interface elements 110 can comprise a menu, icon, user-selectable button, drop-down, slider bar, input field, and the like. As an example, one or more of the interface elements 110 can be configured to receive a selection or input from a user.

In an aspect, the user device 102 can store information relating to configurations and/or capabilities 112 of the user device 102. As an example, the information relating to configurations and/or capabilities 112 can comprise one or more parameters 114, such as device type, requirements, compatibility, versions, or a combination thereof. Configurations and/or capabilities 112 can relate to playback of content via one or more formats, such as HTML5, Flash, Silverlight, or other content players (e.g., Android). Configurations and/or capabilities 112 can be based upon user preferences or user configured settings. However, if the user attempts to play a data type (e.g., media type) that does not playback on the user's platform or device for the preferred playback method, the system can revert to a suitable playback method, regardless of the user preference. Configurations and/or capabilities 112 can relate to the mechanism (e.g., hardware, software, code, etc.) that facilitates user interactions such as interactive functions (e.g., start, pause, seek, etc.) associated with content playback.

In an aspect, one or more software components such as plug-ins 116 can be provided to the user device 102. As an example, plug-ins 116 can comprise an extension or software component that adds specific abilities to another software application. As an example, one or more plug-ins 116 can be configured to customize the functionality of a particular application such as the interface 108. In another aspect, one or more plug-ins 116 can be associated with an identifier 118. As an example, one or more of the identifiers 118 can be any identifier, token, character, string, or the like, for differentiating one plug-in 116 from another plug-in 116. As a further example, the identifiers 118 can comprise information relating to a software program or platform for which the associated plug-in is intended to enhance. Other information can be represented by the identifier 118.

In an aspect, the computing device 104 can be a network device, such as a gateway, router, concentrator, or server for communicating with the user device 102. As an example, the computing device 104 can communicate with the user device 102 for providing services such as network (e.g., IP) services using one or more protocols (e.g., FTP, HTTP, etc.)

In an aspect, the computing device 104 can manage the communication between the user device 102 and a database 120 for sending and receiving data therebetween. As an example, the database 120 can store a plurality of data sets (e.g., routing tables, server identifiers, addresses, etc.), user identifiers or records, authentication information, or other information. As a further example, the user device 102 can request and/or retrieve a file from the database 120. In an aspect, the database 114 can store information relating to the user device 102, such as the configuration information 112 and/or configuration parameters 114. Any information can be stored in and retrieved from the database 120. The database 120 can be disposed remotely from the computing device 104 and accessed via direct or indirect connection. The database 120 can be integrated with the computing system 104 or some other device or system.

In an aspect, one or more data agents 122 can be stored, accessed, and/or generated by the computing system 104. The data agents 122 can be configured as type-dependent agents for processing data based on a data type or platform type. As an example, data type can comprise format, programming language, compatible video interface, compatible platform, or a combination thereof. As a further example, one or more data agents 122 can comprise or be similar to HTML5, Flash, Silverlight, or other data processing agents. In a further aspect, one or more data agents 122 can be implemented by the computing device 104 and/or transmitted to the user device 102 for implementation by the user device 102.

In an aspect, one or more data agents 122 can be selected and/or modified based on one or more of the following factors: capabilities of the playback device, capabilities of a browser, and/or data type. Different devices and/or browsers can have very different playback capabilities, and such configurations can be managed to ensure that the user's playback experience is as seamless as possible. Depending on capabilities (e.g., configurations and capabilities 112) different data agents 122 can be selected to effect playback. As an example, a device may be configured to handle content interaction using HTML5 functions. Accordingly, a data agent 122 configured to interface with HTML5 can be selected to ensure the user can interact with content.

In an aspect, one or more data engines 124 can be stored, accessed, and/or generated by the computing system 104. In another aspect, one or more data engines 124 can be configured to implement platform-specific behavior in an agnostic manner. As such, a user can interact with received data, while the data engine 124 masks or hides the data agent 122 that is used to process the received data. As an example, the data engine 124 can be configured to present data via a consistent API regardless of which data agent 122 is in use. As a further example, data agents 122 can be seamlessly switched, while the data engine 124 remains the same.

In an aspect, the data engine 124 can be configured to implement one or more data processing functions similar to that of the video tag (e.g., HTML5) capabilities. In another aspect, the data engine 124 can be configured so as to provide a consistent API and event system across various data (e.g., media) types. A consistent API can provide a seamless presentation to a user such that the user experience is substantially similar regardless of the underlying data agent 122 being used to process the data.

In an aspect, the data engine 124 can be configured to receive a data asset, such as content. As an example, a data asset can be loaded into the data engine 124. The data engine 124 or other component can determine a type of the data. The data type (e.g., HTML5, flash, Silverlight) can denote a configuration of one or more of the data agent 122 and data engine 124 to use. The data engine 124 can be configured to provide one or more functions (e.g., start, pause, seek). As a further example, unloading the data asset can comprise a two-step process. Playback of the content asset can be stopped, but the configurations of the data engine 124 and selected data agent 122 can be maintained. However, the content asset can also be unloaded and the configurations (e.g., instances) of the data engine 124 and selected data agent 122 can be removed (e.g., removed from storage, removed from active processing, deleted).

In an aspect, the data engine 124 can comprise a data interface configured as a reserve of playback elements (e.g., data agents 122) and a data player configured to manage communication with the playback elements. The data interfaces can be or comprise a permanent object configured to control the communication with one or more document object model (DOM) objects, such as, HTML5 video tags, the SWF player, or the Silverlight player. The data player of the data engine 124 can be configured to control the data interfaces and can "smooth out" the differences between each of the data interfaces in such way that to the data engine 124 each player behaves the same. In another aspect, one or more plug-ins can be provided to expand the functions provided by the data engine 124.

In an aspect, the data engine 124 can comprise an identifier. As an example, the identifier can comprise a string having a resource locator to a configuration file (e.g., config.xml). As a further example, the identifier can comprise an object including a set of configurations. Configurations of the data engine 124 can comprise content scaling such as stretch, resize, expand to fit screen, and "fit," for example. Content scaling can denote how the data engine 124 manages black space in a received data asset. Content scaling can be used to manage the differences between data agents 122. Configurations of the data engine 124 can comprise the presentation of native controls associated with one or more data agents 122 or a conventional player of one or more of the underlying data types. Configurations of the data engine 124 can comprise dynamic information relating to the supported functions of an underlying data agent 122 such as mute, volume control, full screen mode, etc. Configurations of the data engine 124 can comprise playback functions such as pause/unpause, playback position (time or frame), total playback time, playback state (end, complete, error), loaded data/unloaded data, buffer state, show/hide, seek, frame forward, play, full screen mode, mute, volume control, bit rate, etc.

Figure 2:
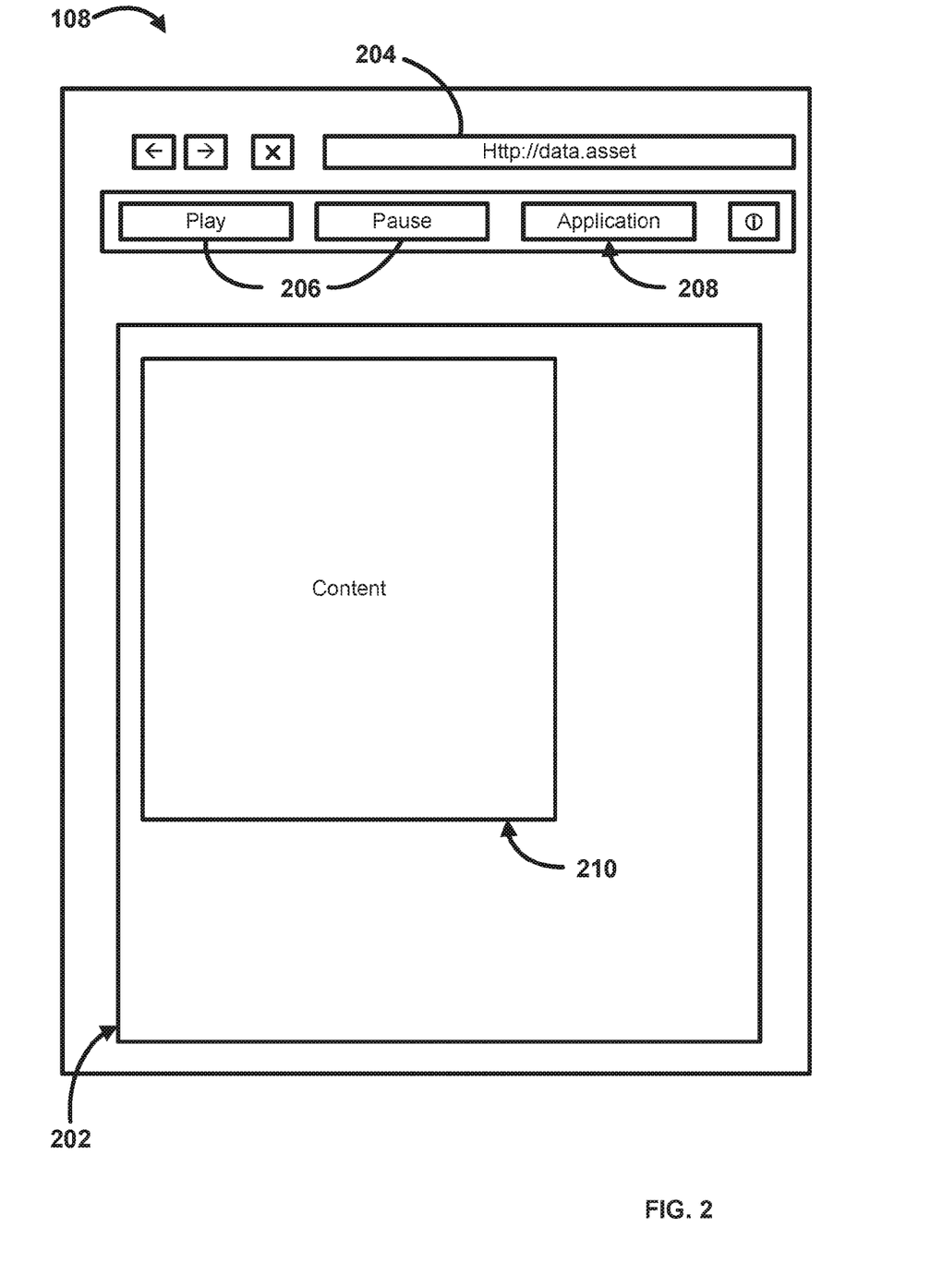
FIG. 2 is a representation of an exemplary interface.

In an aspect, software can be used to implement methods for processing data in an agnostic manner. The methods and systems can comprise a software interface such as interface 108, as illustrated in FIG. 2. By way of example, the interface 108 can be loaded to the user device 102 as an add-on software package. As a further example, the interface 108 can be associated with one or more data agents 122 (FIG. 1) and/or data engines 124 (FIG. 1).

The methods and systems disclosed can utilize one or more interfaces 108 to perform one or more functions in one or more locations. FIG. 2 illustrates an exemplary interface 108 for performing the disclosed methods. This exemplary interface 108 is only an example of an interface and is not intended to suggest any limitation as to the scope of use or functionality of interface architecture. Neither should the interface 108 be interpreted as having any dependency or requirement relating to any one or combination of components illustrated in the interface 108.

In an aspect, the interface 108 can comprise a viewing window 202 for displaying information (e.g. web pages, files, etc.) to the user. As an example, the interface 108 can comprise an address bar 204 or URL bar to allow a user to input a URL for directing the requests of the interface 108. In an aspect, the interface 108 can comprise a toolbar disposed adjacent the address bar 204 of the interface 108 and including one or more interface elements, buttons, or engageable menus. The interface 108 can be presented to the user in any position, form, and environment. As an example, the interface 108 can comprise a plurality of interface elements, such as user-engageable buttons 206 for executing various associated functions (e.g. search function, settings modification, play, pause, seek, and the like.)

In an aspect, the interface 108 can comprise an interface element, such as home button, preset function, or pointer for directing the interface 108 to a pre-defined file or webpage, and/or a plug-in, extension, or an application 208 requiring a plug-in or extension. In another aspect, the interface 108 can be configured to present data to a user, such as via the viewing window 202. As an example, the interface 108 can present content 210 to a user. As a further example, the interface elements can be used to interact with the content 210.

Figure 3:
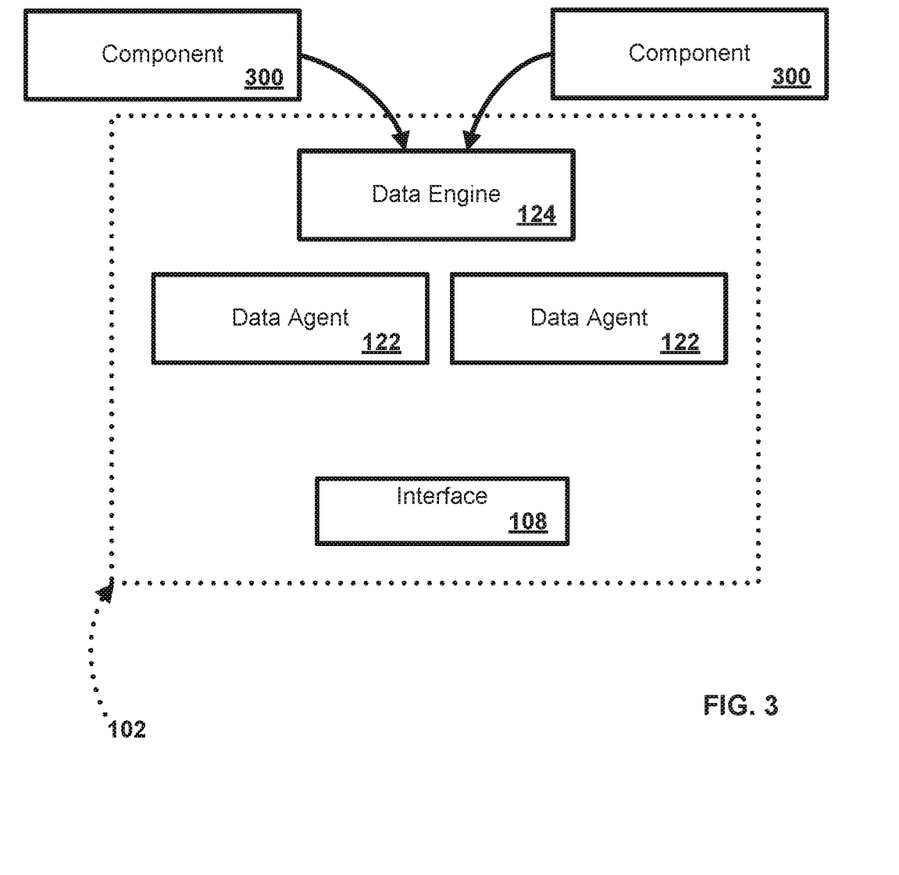
FIG. 3 is a representation of an exemplary system.

In an aspect, the interface 108 can be controlled based on one or more data agents 122 and/or data engines 124, as illustrated in FIG. 3. As such, the data engine 124 can provide a common interface with which developers, editors, and the like can interact. As an example, components 300, such as software components, add-ons, plug-ins, and the like, can be developed to interface with the data engine 124. Accordingly, the components 300 can provide functionality beyond the native functionality of the data engine 124 without requiring a direct compatibility with a particular data agent 122.

In an aspect, the data engine 124 can provide a consistent mechanism for developers to manage playback of data, such as content, in a variety of contexts. Accordingly, the data engine 124 allows developers to write code to a common interface. Developers can focus on creating (e.g., coding) the business logic and user interface environment associated with content playback, without regard to customized code for each individual device or platform. The data engine 124 also allows for consistent testing. Either the data engine 124 can be tested stand-alone for a particular data type or a set of code can use the data engine 124 to create a test mock-up that stands in for actual video playback for testing (e.g., implementing business logic). However, in an aspect, one or more data engines 124 can be customized for a particular device or environment, if desired. As an example, the configurations of the user device 102 can be determined (e.g., by a boot loader) and the data engine 124 can be constructed to provide a common interface between developer components (e.g., components 300) and the particularly configured user device 102.

Figure 4:
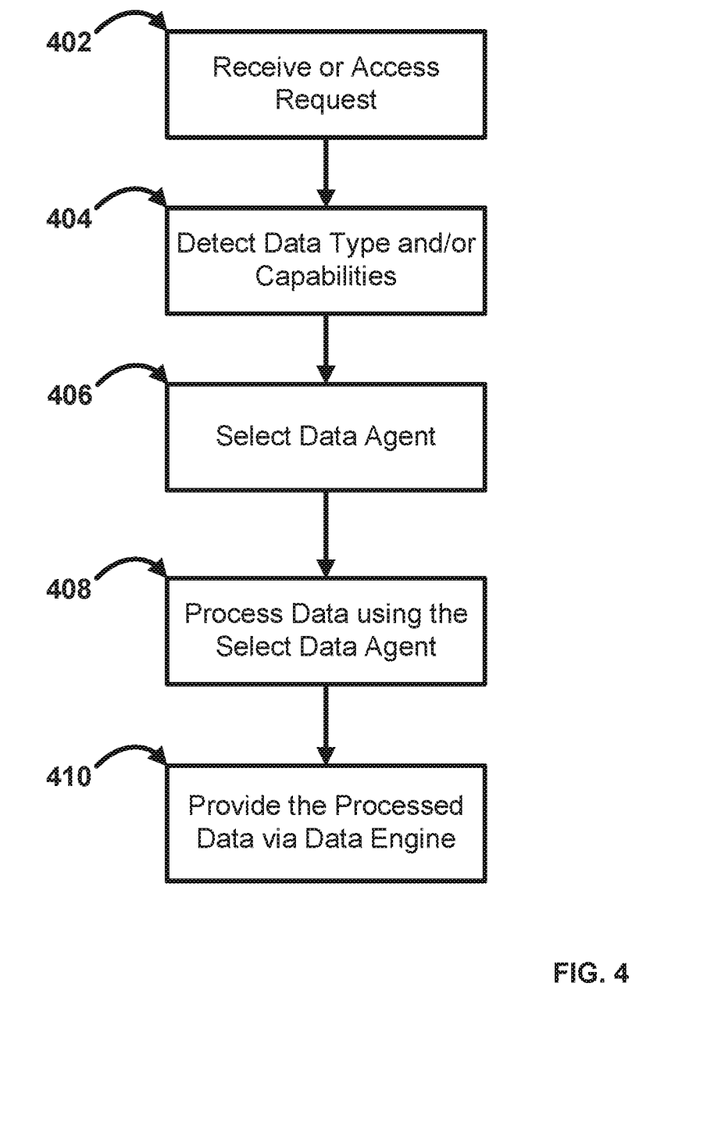
FIG. 4 is a flow chart of an exemplary method.

FIG. 4 illustrates an exemplary method for processing data. In step 402, a request for information can be received or accessed. In an aspect, the request for information can comprise a request for functionality, such as functions relating to the processing of data (e.g., content). As an example, the request can comprise an identifier relating to a particular content asset.

In step 404, a type of data representing the information requested can be detected. In an aspect, the type of data can comprise format, programming language, compatible video interface, compatible platform, or a combination thereof. In another aspect, the type of data can relate to configurations such as capabilities of a device requesting the information in step 402.

In step 406, a data agent of a plurality of data agents can be selected. In an aspect, the data agent can be selected based upon the type of data detected. As an example, the data agent can be type-dependent and a particular data agent is selected to facilitate processing of a particular type of data. In another aspect, the type-dependent agent can facilitate content playback.

In step 408, the data can be processed via the select type-dependent agent. In an aspect, the selected data agent can be provided to a device for processing the requested information.

In step 410, the processed data can be provided via a data engine. In an aspect, the processed data is presented via an agnostic data engine. As an example, the agnostic data engine allows a user can interact with received data, while the agnostic data engine masks or hides the data agent that is used to process the received data. As an example, the data engine can be configured to present data via a consistent API regardless of which data agent is in use. As a further example, data agents can be seamlessly switched, while the data engine remains the same. As yet a further example, the agnostic data engine is associated with a document object model. In another aspect, providing the processed data comprises rendering one or more of images, video, and audio.

Figure 5:
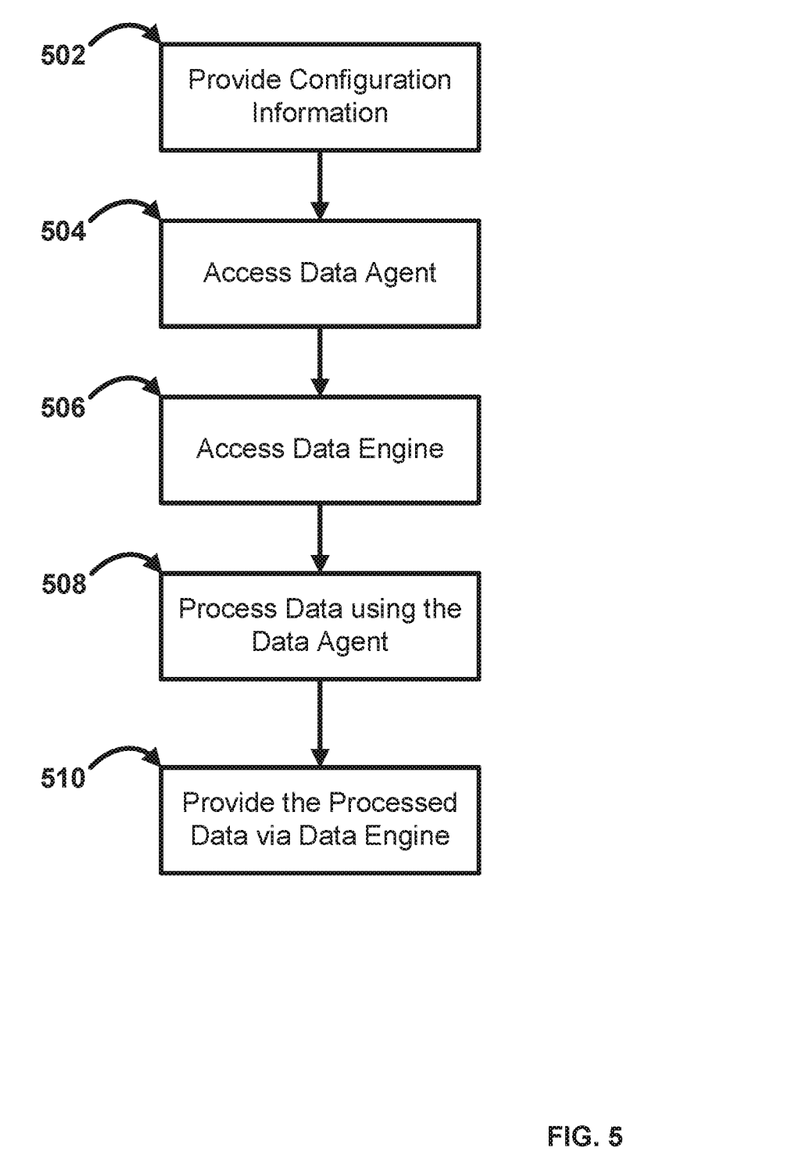
FIG. 5 is a flow chart of an exemplary method.

FIG. 5 illustrates an exemplary method for processing data. In step 502, configuration information can be provided. In an aspect, the configuration information can relate to capabilities of a device such as a user device. Configuration information can comprise a platform used by the device for data processing such as content playback. Configuration information can comprise user preferences relating to data processing such as content playback. As an example, the information can relate to one or more parameters, such as device type, requirements, compatibility, versions, or a combination thereof.

In step 504, a data agent can be accessed (e.g., received, selected, initiated, received access to, etc.). In an aspect, the data agent can be selected and transmitted to a device based upon the configuration information provided in step 502. As an example, the data agent can be type-dependent and a particular data agent is received to facilitate processing of a particular type of data.

In step 506, a data engine can be accessed (e.g., received, selected, initiated, received access to, etc.). In an aspect, the data engine can be selected and transmitted to a device based upon the configuration information provided in step 502. As an example, the data engine can be type-agnostic to facilitate a common interface. In step 508, the data can be processed via the received data agent. In another aspect, the data agent can facilitate content playback.

In step 510, the processed data can be provided via the received data engine. In an aspect, the processed data is presented via an agnostic data engine. As an example, the agnostic data engine allows a user to interact with received data, while the agnostic data engine masks or hides the data agent that is used to process the received data. As an example, the data engine can be configured to present data via a consistent API regardless of which data agent is in use. As a further example, data agents can be seamlessly switched, while the data engine remains the same. As yet a further example, the agnostic data engine is associated with a document object model. In another aspect, providing the processed data comprises rendering one or more of images, video, and audio.

Figure 6:
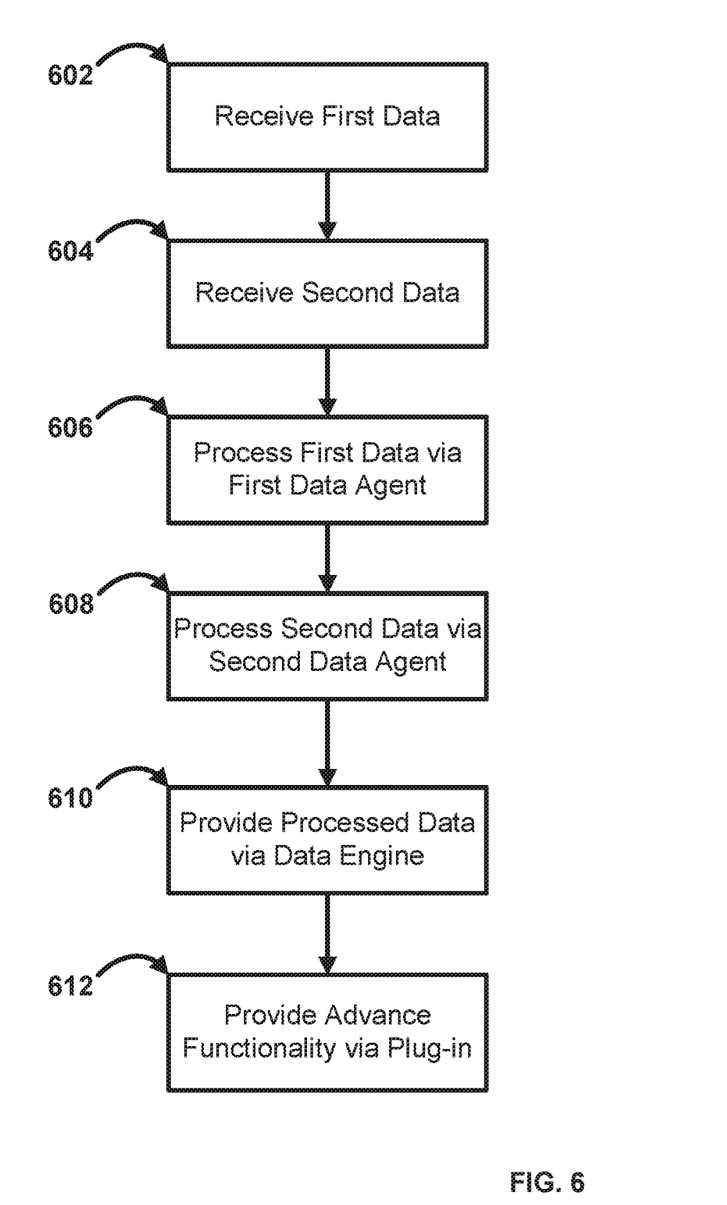
FIG. 6 is a flow chart of an exemplary method.

FIG. 6 illustrates an exemplary method for processing data. In step 602, first data can be received or accessed. In an aspect, the first data can comprise one or more content assets. As an example, the first data can have a data type, such as a format, programming language, compatible video interface, compatible platform, or a combination thereof. In another aspect, the type of data can relate to configurations, such as capabilities of a device requesting the information in step 602.

In step 604, second data can be received or accessed. In an aspect, the first data can comprise one or more content assets. As an example, the second data can have a data type, such as a format, programming language, compatible video interface, compatible platform, or a combination thereof. In another aspect, the type of data can relate to configurations such as capabilities of a device requesting the information in step 602. The first data can have the same or different type.

In step 606, the first data can be processed via a data agent. As an example, the data agent can be type-dependent and a particular data agent is selected to facilitate processing of a particular type of the first data. In another aspect, the first data agent can facilitate content playback.

In step 608, the second data can be processed via a data agent. As an example, the data agent can be type-dependent and a particular data agent is selected to facilitate processing of a particular type of the second data. In another aspect, the second data agent can facilitate content playback.

In step 610, the processed first data and/or second data can be provided via a data engine. In an aspect, the processed data is presented via an agnostic data engine. As an example, the agnostic data engine allows a user to interact with received data, while the agnostic data engine masks or hides the data agent that is used to process the received data. As an example, the data engine can be configured to present data via a consistent API regardless of which data agent is in use. As a further example, data agents can be seamlessly switched, while the data engine remains the same. As yet a further example, the agnostic data engine is associated with a document object model. In another aspect, providing the processed data comprises rendering one or more of images, video, and audio.

In step 612, functionality can be provided based on a component such as a plug-in. In an aspect, advance functionality that is not native to the data engine can be provided to a user through the component. Such a component can interface with the data engine.

Figure 7:
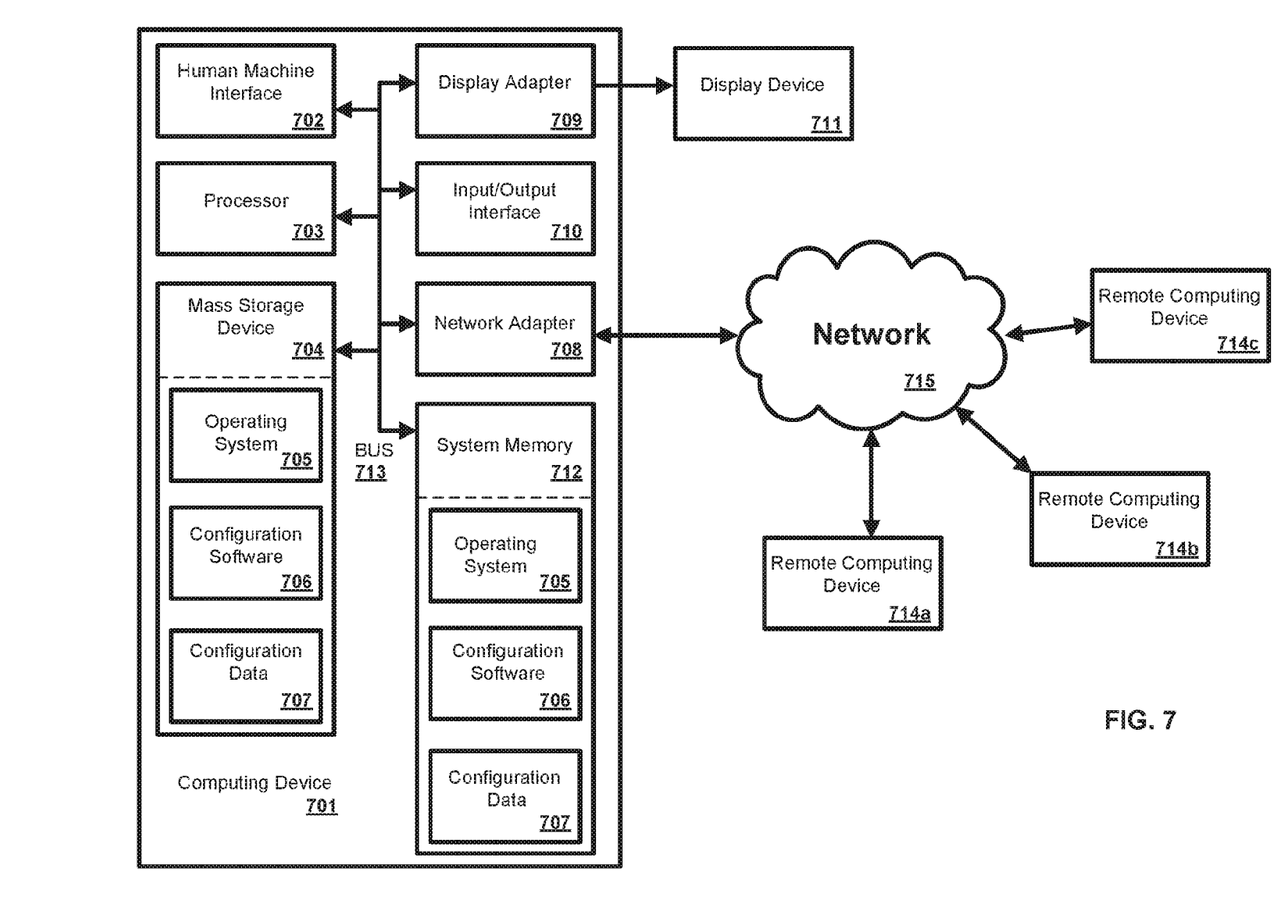
FIG. 7 is a block diagram of an exemplary computing system.

In an exemplary aspect, the methods and systems can be implemented on a computing system such as computing device 701 as illustrated in FIG. 7 and described below. By way of example, one or more of the user device 102 and the computing device 104 of FIG. 1 can be a computer as illustrated in FIG. 7. Similarly, the methods and systems disclosed can utilize one or more computers to perform one or more functions in one or more locations. FIG. 7 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computing device 701. The components of the computing device 701 can comprise, but are not limited to, one or more processors or processing units 703, a system memory 712, and a system bus 713 that couples various system components including the processor 703 to the system memory 712. In the case of multiple processing units 703, the system can utilize parallel computing.

The system bus 713 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 713, and all buses specified in this description can also be implemented over a wired or wireless network connection and each of the subsystems, including the processor 703, a mass storage device 704, an operating system 705, configuration software 706, configuration data 707, a network adapter 708, system memory 712, an Input/Output Interface 710, a display adapter 709, a display device 711, and a human machine interface 702, can be contained within one or more remote computing devices 714a,b,c at physically separate locations, connected through buses of this form, in effect implementing a fully distributed system.

The computing device 701 typically comprises a variety of computer readable media. Exemplary readable media can be any available media that is accessible by the computing device 701 and comprises, for example and not meant to be limiting, both volatile and non-volatile media, removable and non-removable media. The system memory 712 comprises computer readable media in the form of volatile memory, such as random access memory (RAM), and/or non-volatile memory, such as read only memory (ROM). The system memory 712 typically contains data such as configuration data 707 and/or program modules such as operating system 705 and configuration software 706 that are immediately accessible to and/or are presently operated on by the processing unit 703.

In another aspect, the computing device 701 can also comprise other removable/non-removable, volatile/non-volatile computer storage media. By way of example, FIG. 7 illustrates a mass storage device 704 which can provide non-volatile storage of computer code, computer readable instructions, data structures, program modules, and other data for the computing device 701. For example and not meant to be limiting, amass storage device 704 can be a hard disk, a removable magnetic disk, a removable optical disk, magnetic cassettes or other magnetic storage devices, flash memory cards. CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 704, including by way of example, an operating system 705 and configuration software 706. Each of the operating system 705 and configuration software 706 (or some combination thereof) can comprise elements of the programming and the configuration software 706. Configuration data 707 can also be stored on the mass storage device 704. Configuration data 707 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computing device 701 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 703 via a human machine interface 702 that is coupled to the system bus 713, but can be connected by other interface and bus structures, such as a parallel port, game port, an IEEE 1394 Port (also known as a Firewire port), a serial port, or a universal serial bus (USB).

In yet another aspect, a display device 711 can also be connected to the system bus 713 via an interface, such as a display adapter 709. It is contemplated that the computing device 701 can have more than one display adapter 709 and the computer 701 can have more than one display device 711. For example, a display device can be a monitor, an LCD (Liquid Crystal Display), or a projector. In addition to the display device 711, other output peripheral devices can comprise components such as speakers (not shown) and a printer (not shown) which can be connected to the computing device 701 via Input/Output Interface 710. Any step and/or result of the methods can be output in any form to an output device. Such output can be any form of visual representation, including, but not limited to, textual, graphical, animation, audio, tactile, and the like. The display 711 and computing device 701 can be part of one device, or separate devices.

The computing device 701 can operate in a networked environment using logical connections to one or more remote computing devices 714*a,b,c*. By way of example, a remote computing device can be a personal computer, portable computer, a smart phone, a server, a router, a network computer, a peer device or other common network node, and so on. Logical connections between the computing device 701 and a remote computing device 714*a,b,c* can be made via a network 715, such as a local area network (LAN) and a general wide area network (WAN). Such network connections can be through a network adapter 70& A network adapter 708 can be implemented in both wired and wireless environments. Such networking environments are conventional and commonplace in dwellings, offices, enterprise-wide computer networks, intranets, and the Internet.

For purposes of illustration, application programs and other executable program components such as the operating system 705 are illustrated herein as discrete blocks, although it is recognized that such programs and components reside at various times in different storage components of the computing device 701, and are executed by the data processor(s) of the computer. An implementation of configuration software 706 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence (AI) techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method, comprising:
   receiving, from a user device, a request for information;
   detecting a type of data representing the information requested;
   selecting, based on the type of data detected and from a plurality of data agents, a data agent, wherein each of the plurality of data agents facilitates processing of a particular type of data; and
   transmitting, to the user device, the selected data agent and an agnostic data engine, wherein the agnostic data engine facilitates a presentation of data processed by the selected data agent in the user device.

2. The method of claim 1, wherein the agnostic data engine is configured to facilitate the presentation of processed data independent of which of the plurality of data agents processed the processed data.

3. The method of claim 1, wherein the request for information comprises configuration information of the user device.

4. The method of claim 3, wherein the data agent is further selected from the plurality of data agents based on the configuration information.

5. The method of claim 3, further comprising selecting the agnostic data engine based on the configuration information.

6. The method of claim 3, wherein the configuration information comprises at least one of a device type of the user device, a requirement, a compatibility parameter, a version, or a combination thereof.

7. The method of claim 1, wherein the agnostic data engine comprises an application program interface presented independent of the plurality of data agents.

8. The method of claim 1, wherein the type of data detected is content data.

9. A method, comprising:
   transmitting a request for data;
   in response to the request, receiving the data and a data agent, wherein the data corresponds to a data type, wherein the data agent is one of a plurality of data agents each facilitating a processing of data of a particular data type, and wherein the data agent is configured to process data of the data type;
   processing, by the data agent, the data;
   transmitting, by the data agent, the processed data to an agnostic data engine; and
   rendering, by the agnostic data engine, the processed data.

10. The method of claim 9, wherein the data comprises one or more of audio data, video data, or image data.

11. The method of claim 9, wherein the agnostic data engine is configured to render processed data independent of which of the plurality of data agents processed the processed data.

12. The method of claim 9, further comprising selecting the data agent from the plurality of data agents based on the data type.

13. The method of claim 9, further comprising selecting the data agent from the plurality of data agents based on configuration information of a user device.

14. The method of claim 9, wherein transmitting the processed data to the agnostic data engine comprises accessing an application program interface (API) provided by the agnostic data engine.

15. An apparatus comprising:
   one or more processors; and
   a memory storing processor-executable instructions that, when executed by the one or more processors, cause the apparatus to:
   receive content data having a data type;
   process, by a data agent corresponding to the data type, the received content data, wherein the data agent is one of a plurality of data agents, each facilitating a processing of a respective data type;
   provide the processed content data to an agnostic data engine; and
   render, by the agnostic data engine, the processed content data.

16. The apparatus of claim 15, wherein the processor-executable instructions, when executed by the one or more processors, further cause the apparatus to:
   transmit a request for the content data; and
   receive the data agent in response to the request.

17. The apparatus of claim 15, wherein the processor-executable instructions, when executed by the one or more processors, further cause the apparatus to access an application program interface (API) provided by the agnostic data engine.

18. The apparatus of claim 15, wherein the content data comprises one or more of audio data, video data, or image data.

19. The apparatus of claim 15, wherein the processor-executable instructions, when executed by the one or more processors, further cause the apparatus to:
   transmit configuration information associated with the apparatus; and
   wherein one or more of the data agent or the agnostic data engine are selected based on the configuration information.

20. The apparatus of claim 15, wherein the agnostic data engine is configured to render processed content data independent of which of the plurality of data agents processed the received content data.

* * * * *